Aug. 28, 1928.
E. A. SPERRY
1,682,358
COMBUSTION ENGINE DRIVE FOR SHIPS
Original Filed March 28, 1922   3 Sheets-Sheet 1
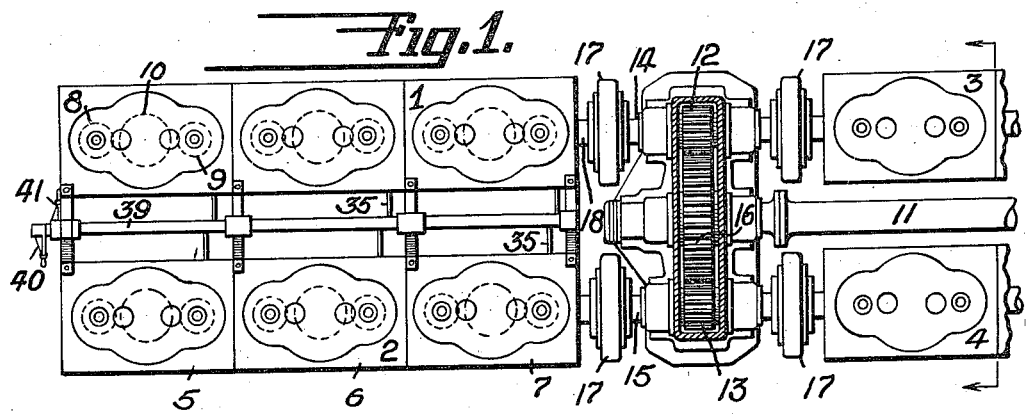
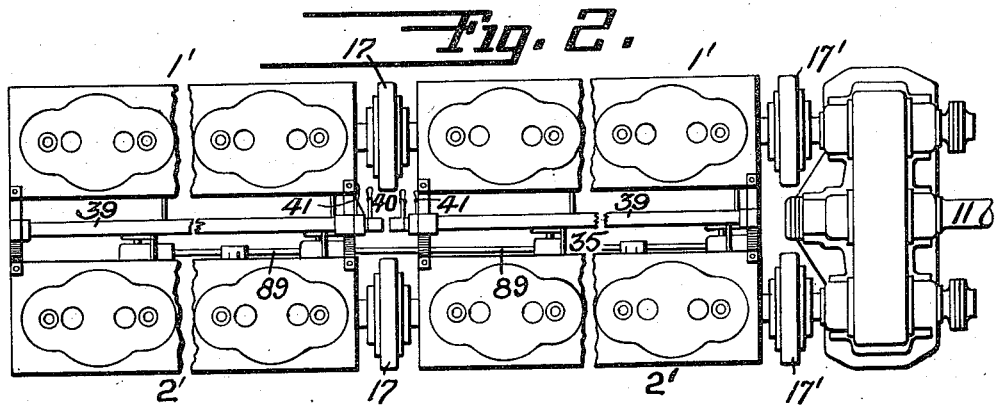
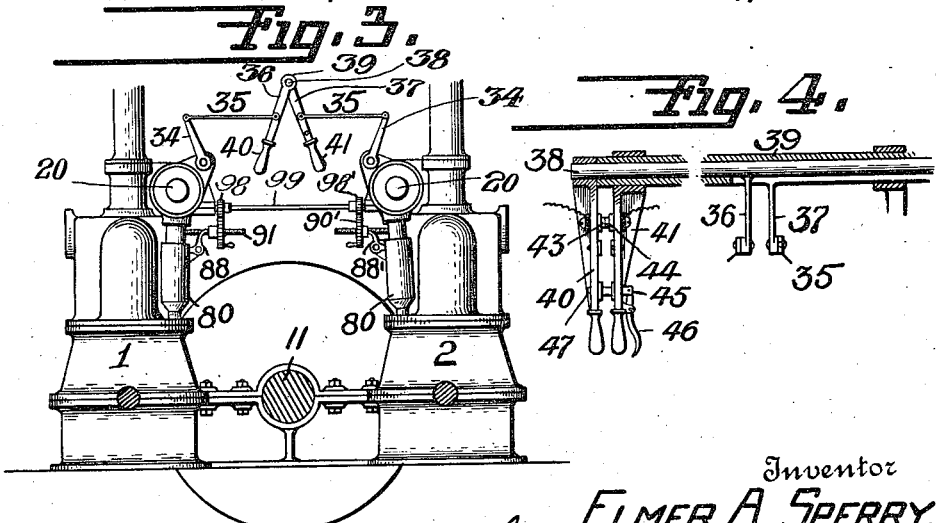
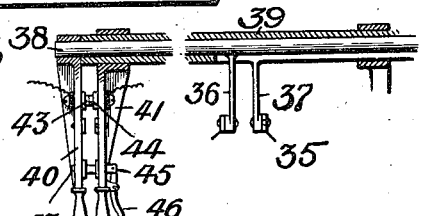
Inventor
ELMER A. SPERRY.
By his Attorney
Herbert H. Thompson

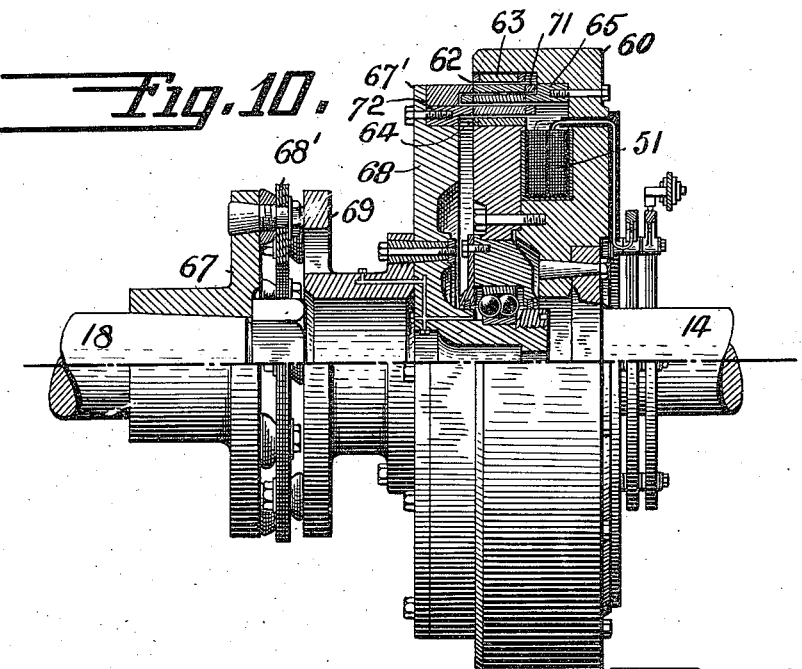
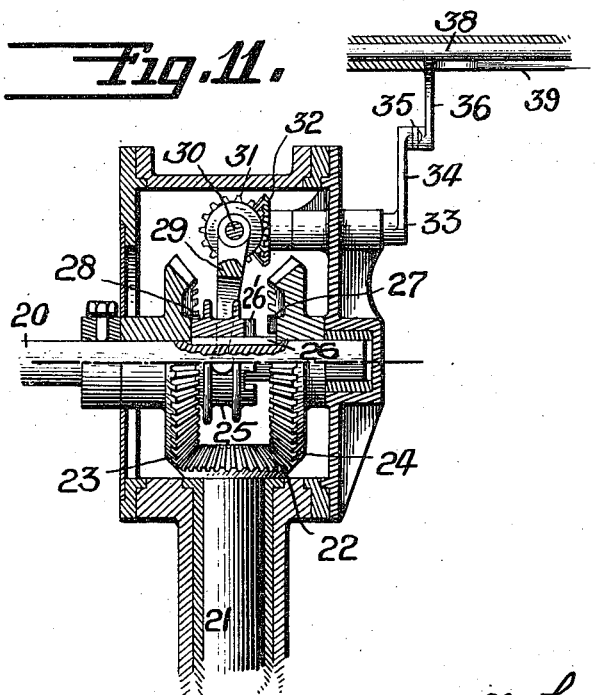
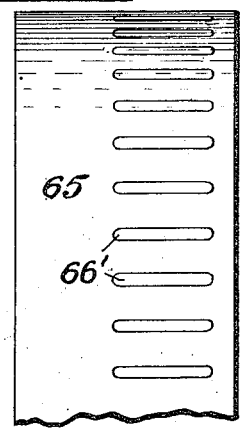

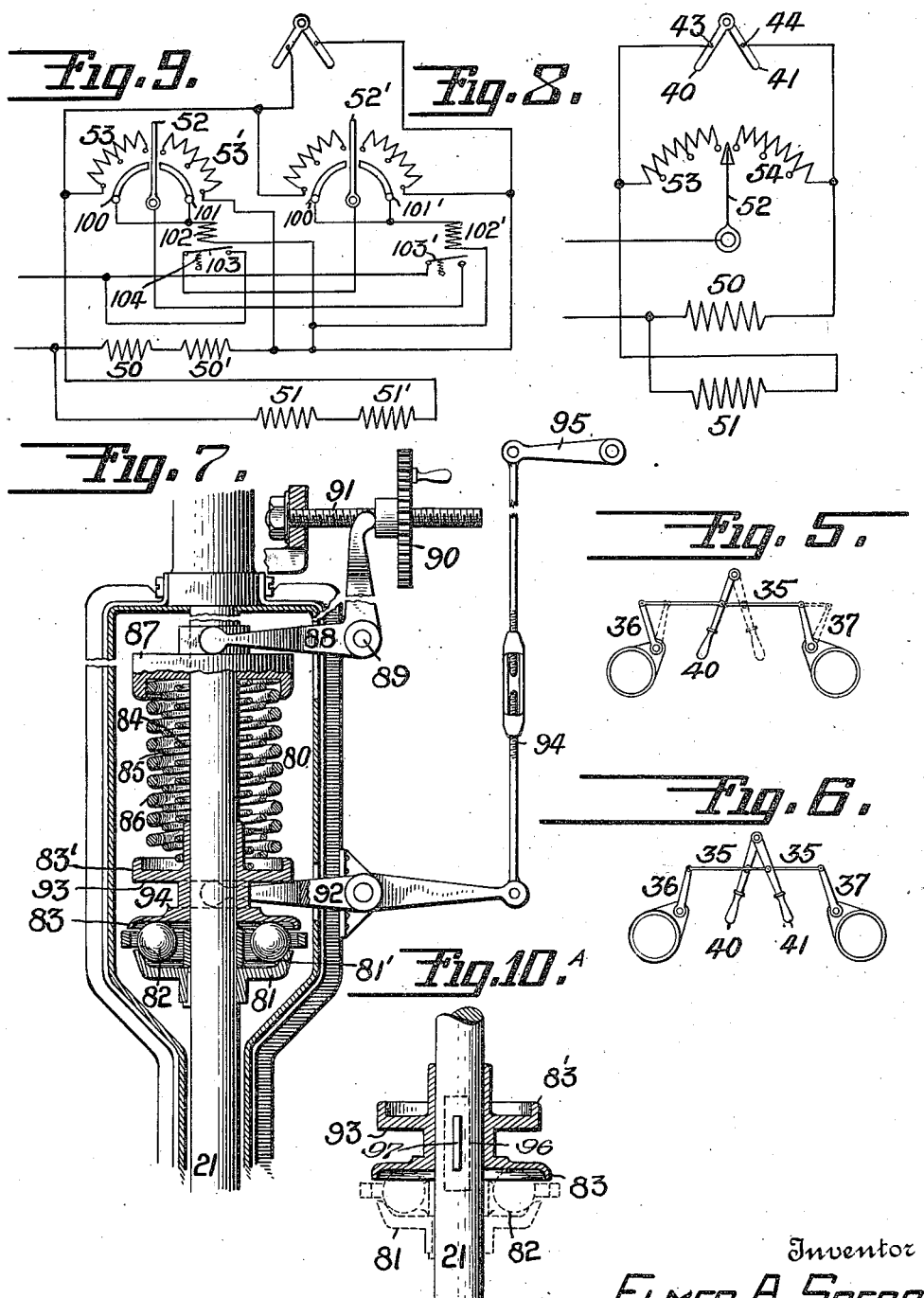

Patented Aug. 28, 1928.

1,682,358

UNITED STATES PATENT OFFICE.

ELMER A. SPERRY, OF BROOKLYN, NEW YORK, ASSIGNOR TO SPERRY DEVELOPMENT COMPANY, OF DOVER GREEN, DELAWARE, A CORPORATION OF DELAWARE.

COMBUSTION-ENGINE DRIVE FOR SHIPS.

Application filed March 28, 1922, Serial No. 547,384. Renewed January 18, 1928.

This invention relates to an oil or internal combustion engine drive for ships. The efficiency of such driven ships for ordinary travel has now been demonstrated beyond a possibility of a doubt. The great drawback of the internal combustion engine for this use however, is in maneuvering the ship. The Diesel engine which is commonly employed for this purpose has a very limited speed range and cannot be reversed with sufficient quickness and surety to be relied upon to slow down or stop the ship in maneuvering or in an emergency. With the ordinary Diesel engine also, it is impossible to control the speed accurately under variable loads, i. e., where the propeller shaft is coupled and uncoupled from the engines, since with the ordinary speed control, great variations in load result in corresponding variations in speed, with the possibility of stalling the engine ever present.

It is the purpose of this invention to overcome these difficulties in maneuvering by providing means whereby the ship's propeller may be reversed with even greater quickness and sureness than with the common reciprocating steam engine drive, and whereby the speed of the engines may be controlled to a nicety.

Referring to the drawings in which what are now considered the preferred forms of my invention are shown:

Fig. 1 is a diagrammatic plan view of the engines of a ship designed according to my invention.

Fig. 2 is a similar view of a slightly modified manner of connecting the engines.

Fig. 3 is an end elevation of the engines, the propeller shaft and crank shaft being shown in section.

Fig. 4 is an enlarged sectional view of the control handles for said engine.

Figs. 5 and 6 are details showing various positions said handles may assume.

Fig. 7 is a sectional view on an enlarged scale of the speed governing and control means for the engine.

Fig. 8 is a diagram illustrating the electric connections for the control means.

Fig. 9 is a diagram of a modified form of connections.

Fig. 10 is a side elevation, partly in section, of one of the non-mechanical, non-slip electrical clutches used between the engines and the propeller shaft.

Fig. 10$^A$ is a detail showing the loose connection between the governor and the shaft which actuates said governor.

Fig. 11 is a large sectional view of the reversing means for one of the engines.

Fig. 12 is an enlarged view of one of the clutch rings.

Of the drawbacks of combustion engines for ships drive, their inability to reverse quickly and surely, is perhaps the greatest. To overcome this defect, I provide for driving the ship, a plurality of groups of engines, 1 and 2, and possibly 3 and 4. Said engines may be of any type of combustion engine, such as the Diesel or semi-Diesel, but I prefer to employ, for reasons which will hereinafter appear, the Sperry compound internal combustion engine, such as described in my Letters Patent 1,325,810 of December 23, 1919, and also in my co-pending application, serial No. 405,917 filed August 25, 1920. As illustrated, each group of engines is composed of three compound engine units, 5, 6 and 7, each of said units comprising two high pressure cylinders 8 and 9 and a centrally located low pressure cylinder 10. Each group is geared to the propeller shaft 11 as by means of pinions 12 and 13 on stub shafts 14 and 15 directly connected to the groups of engines on each side. A large gear 16 is mounted directly on the propeller shaft.

I interpose between the crank shafts of each group of engines and the propeller shaft, a clutch 17 adapted to disconnect at will any group of engines from the propeller shaft. Preferably said clutch is located as shown between the crank shaft 18 of each group and the corresponding stub shaft 14 or 15. Said clutch is preferably of an electrical type, so as to be actuated from a distance. The preferred form of clutch for this purpose is illustrated in Fig. 10 and will be described more in detail hereinafter.

Each group of engines is also provided with some form of reversing means, such as described in my copending application, Serial No. 462,108 filed April 18th, 1921. To reverse the engine, the only thing that is necessary, aside from the necessity for self starting, (which feature is fully described in said application), is to reverse the relative direction of the cam shaft with respect to the engine. To effect this, the cam shaft 20 is shown as driven from the governor shaft 21 in either of opposite directions, by means of the bevel pinion 22 on the shaft 21 and two opposite bevel gears 23 and 24 loosely mounted on shaft 20. Either one of said gears are adapted to be connected to the shaft 20 by means of sliding clutch member 25 which is keyed to said shaft at 26 and provided with clutch teeth 26', on each face thereof, adapted to be brought into engagement with corresponding clutch teeth 27, 28 on the said bevel gears. Said clutch is actuated by an arm 29 on stub shaft 30. Said shaft is provided with a bevel pinion 31 meshing with pinion 32 on a second shaft 33. Said shaft is provided with an arm 34 adjacent its outer end, shown as connected by link 35 (Fig. 3), with an arm 36 on shaft 38. The opposite unit is provided with similar reversing mechanism connected with arm 37 on a sleeve 39 surrounding said shaft. Control handles 40 and 41 are fixed respectively to said shaft and sleeve, so that the two engines may be governed as a unit or separately, as desired. Preferably the engine is so arranged that when the handles are together as shown in Figs. 4 and 5, the engines revolve in the same effective direction, i. e., they drive the propeller shaft in the same direction. Thus, when the handles are in the dotted line position in Fig. 5, say, both engines will drive the ship forward, while when the levers are in the full line position, both engines will drive the ship backwards. When, however, the levers are in opposite positions, as shown in Figs. 3 and 6, the two groups of engines will tend to revolve the propeller shaft in opposite directions. To prevent any possibility of damage to the transmission gears and also to provide a ready reversing means for the ship, I provide means for uncoupling at least one group of engines from the propeller shaft whenever the two groups are turned in opposite directions. For this purpose, I have shown co-operating contacts 43 and 44 on the control handles, respectively.

In order to enable the two handles to be moved together readily, I may provide a catch 45 which normally locks the levers together, so that they will move together. By grasping handle 41 by the palm of the hand and pressing down on the hand piece 46, it will readily be apparent that the pin 47 will be released from member 40 so that they may be moved independently.

Referring now to the wiring diagram, Fig. 8, it will be seen that the contacts 43 and 44 are in circuit with a rheostat 52, 53, 54 and the energizing coils 50 and 51 of the electric clutches, so that when the contacts are together, the clutches of both groups of engines are adapted to be energized so that both engines drive the ship, but when the contacts are separated, at least one clutch is adapted to be deenergized. Which coil is deenergized by the separation of the contacts depends upon the position of the manually controlled rheostat arm 52. When this arm is in contact with points 53, the separation of the contacts 43, 44 deenergizes coil 50, coil 51 remaining energized, while when the rheostat arm is in contact with points 54, the reverse takes place. When, on the other hand, the arm is in the neutral position and contact points 43, 44 open, both coils will be deenergized and the propeller shaft stopped. Assuming that coil 51 is the coil controlling the engine normally used to drive the ship forward, the rheostat arm will then be left in contact with point 53. With contacts 43 and 44 together, all engines will be driving the ship forward, while as soon as they were separated, coil 50 would be deenergized and the set of engines connected thereto reversed. All the operator need do then to reverse the propeller shaft is to move the arm 52 from contact 53 to contact 54 which would bring into operation the oppositely revolving engine and disconnect the other engine. To stop the propeller, the arm 52 is moved to the central position. It is obvious that the control handle 52 may be located at any place on the ship and that more than one may be employed, if desired, in an inter-locking system, as will be hereinafter described. It is obvious that having properly set handle 52, as soon as the operator starts to move one of the handles 40, 41 away from the other handle that the contacts 43, 44 will be broken, thereby de-energizing the clutch of the engine being reversed. This is desirable because it is advantageous to disconnect the engine affected before it is actually reversed, or in other words, just as soon as it starts to slow down below the speed of the other engines. By this means the affected engine is prevented from dragging on the others during the process of being reversed or cut out. After the engine is reversed, when it is desired to reverse the propeller, all that need be done is to move arm 52 to the opposite side.

The rheostat also serves to vary the strength of the current to the coils, for the following purpose. For handling the heavy torques transmitted in marine engines, I prefer to employ an electro-magnetic non-friction power transmitting coupling or clutch, such as illustrated in Fig. 10. On the stub shaft 14 is mounted one of the clutch members 60 adapted to contain a coil 51 causing the passage of magnetic flux across the air gap 62 of said member. Said gap is provided with alternate magnetic and non-magnetic sections or strips 63, 64. In order to increase the number of air gaps, I also employ one or more rings 65 composed preferably of a non-magnetic base having high electrical conductivity. Within said ring 65 are inserted magnetic inserts or teeth 66' (see Fig. 12).

Connected to the crank shaft 18 of the engine is a driving member 67. A member 69 is shown as connected to member 67 on the crank shaft through the universal or flexible joint 68', to prevent difficulties due to non-alignment of the bearings. Member 67' is shown as made up of said intermediate block 69 connected to the multiple disks 68' forming the flexible coupling and plate 68. Said plate has preferably secured to the outer end thereof, one or more annular rings 71, 72, similar to ring 65 lying between said ring 65 and the adjacent pole formed by the C shaped air gap in member 60.

It will be readily apparent that due to the passage of the strong magnetic flux across the gap that a powerful torque will be exerted between the magnetic teeth connected to the member 67' and the teeth on the member 60. This torque is maximum when the speeds of the two members are the same, so that the clutch forms an ideal one to one connection without any contacting teeth or frictional surfaces.

The clutch will also pull in when the speeds are not the same, due to the induction generator action of the relatively revolving parts, which induces heavy eddy-currents in the copper surrounding the magnetic teeth. This clutch however forms no part of this invention, but is separately claimed in my co-pending application, Serial No. 345,660, filed Dec. 17, 1919.

It will also be readily apparent that when the speeds of the driving and driven member are different, such as in starting the ship, that the torque of the clutch will vary with the strength of the current passing through the coil 51. It will therefore be apparent that by moving the rheostat arm 52, the speed of the propeller may be greatly varied, without varying the speed of the engine. With the speed limitations of the combustion engine in mind, it will be readily apparent that this affords a great advantage, rendering it possible to turn over the propeller very slowly when approaching a dock or the like, without slowing the engines down so far that they will be in danger of stopping. This clutch also forms an elastic link, which it will be noted is used between the engine units as well as between an engine and the reduction gear (see Fig. 2).

In the Sperry compound combustion engine, a constant volume of air is taken into the combustion cylinder on each stroke, and the speed and power of the engine are controlled practically entirely by controlling the amount of oil injected into the cylinder. Preferably, this oil is injected in the raw state, i. e., without air, such injection being known as solid injection, so that the speed of the engine is controlled by throttling the oil supply, which method proves quite as simple and effective as the throttle of the steam engine. For marine work however, employing my clutch, this method possesses a great disadvantage, as the engine may be idling and then have the propeller load suddenly thrown on the same, which would quickly stall the engine unless the operator were quick enough to open the throttle valve at the same time. I have provided means therefore for preventing this contingency and at the same time enabling the engine to be entirely controlled from a distance. To effect this purpose, I prefer to work through a special form of speed governor 80, such as shown in Fig. 7. Mounted on the shaft 21 is a cup shaped member 81 in which are placed a plurality of balls 82. Resting on said balls is a second cup shaped member 83 which may also revolve with the shaft. Said second member is pressed down on the balls by an adjustable pressure means, such as springs 84, 85 and 86 held between the upper portions 83' of said member 83 and upper adjustable member 87. Preferably a loose connection is employed between the plate 83 and shaft 21 so that the jarring and vibration of the engine as it runs will maintain the balls in a "nascent" state, i. e., in a state of motion. This may be accomplished by making the slot 96 in member 83 somewhat broader than the key 97 on shaft 21 extending into the same. Also said slot may be made longer than necessary to allow for the up and down movement of member 83 for the same purpose. A plurality of springs are employed, so that the pressure tending to prevent the rise of plate 83 due to the centrifugal force of the balls rising on the inclined edges 81' of the plate 81 will steadily and rapidly become greater as the plate 83 revolves at increasing speed. For this purpose the springs are of graduated stiffness or spring gradient as well as graduated length as shown in Fig. 7. While in Fig. 7, the outer springs are shown as materially above plate 93, this is done for purposes of illustration only, and in practice when arm 88 is horizontal, the springs should be in contact, or very nearly in contact with said plate. It will also become apparent that the pressure exerted by the springs may be readily varied by adjusting the position of member 87. This may be effected by means of bell crank lever 88 pivoted at 89, one forked end of which bears on the top of member 87, while the other forked end bears against the hub of hand wheel 90 threaded on shaft 91. It will be readily apparent that by screwing in or out the hand wheel 90, the tension of said springs thereby and the pressure on the plate 83 may be readily varied. If desired, the speed of several engine units may be controlled simultaneously from one point. For this purpose the shaft 89, which turns with bell crank lever 88 is shown in Fig. 2 as extending along all groups of power units 2' on one side so that the bell crank levers 88 on each unit will be operated. Also, if desired, the opposite group of units may be simultaneously controlled. This idea is shown in Figs. 3 and 7, wherein handwheel 90 is shown as provided with gear teeth meshing with a pinion 98 on a cross shaft 99. Said shaft also carries a pinion 98' meshing with wheel 90' so that rotation of either hand wheel will operate both. Said plate 83 may be directly connected to the fuel throttle valve of the engine as by means of the forked lever 92, the forked end of which rests between shoulders 93 and 94 of said member 83 while the other end is connected through adjustable link 94 to the lever 95 which represents the fuel control lever of the engine. With such a speed governing means, it will be readily apparent that the speed of the engine may be governed at will, without running the danger of stalling the engine by the sudden throwing on of a load, since the instant the engine slows down under the load, the governor opens further the fuel valve and consequently renders it possible to operate the engine at full capacity at any speed within the limits it is designed for.

In the form of the invention shown in Fig. 2, several engine units are employed in tandem. Instead of endeavoring to line up all of these bearings and employ a common crank shaft, I prefer to mount the units separately and couple the crank shafts by the same type of power transmitting coupling 17' as employed in Fig. 1 and shown in detail in Fig. 10. Such a coupling is self aligning, smooths out the piston impulses and furnishes ready means of cutting out and shutting down some of the engine units when maneuvering or cruising slowly.

A simple interlocking system adapted to be employed on ships where engine room signals and controls are located at other places on the ship in addition to the pilot house is illustrated in Fig. 9. On comparison of this figure with Fig. 8, the control arms 52, 52', rheostats 53, 53', etc., and clutch coils 50, 50', 51, 51' will be recognized.

It will be understood that the control rheostats 52, 52' are located at convenient points about the ship, the system illustrated being adapted for indefinite multiplication, so that as many control rheostats may be provided, as desired.

In order to prevent damage to the engine and to prevent one operator interfering with the control of another operator, I prefer to provide an interlocking arrangement which will prevent one operator from interfering with another. A simple interlocking system is illustrated consisting of auxiliary contact strips 100 and 101 on rheostat 52 and 100', 101' on rheostat 52'. The former strips are in circuit with solenoid or electro-magnet 102 which is adapted to open, when excited, the switch 103 in circuit with the arm 52'. Said switch is normally held closed by the spring 104. Similarly, contact stops 100' and 101' are in circuit with an electromagnetic coil 102' adapted to open switch 103' in circuit with arm 52. It will be readily seen therefore, that the first operator to move the control arm 52 or 52' will remain in absolute control of the engine, without interference by other operators. In case however, he desires to relinquish his control, he merely turns his arm back to the neutral position and leaves it there, when the first of the other operators to come in will be the one to control the engines.

It will be understood that in the form shown, the arms 40 and 41 are controlled in the engine room from signals transmitted by the operator in charge of the handles 52. It will also be understood that distant control means for the arms 40 and 41 may be provided, if desired, and that these also may be controlled directly from the pilot house, bridge, or other point on the ship. For this purpose any suitable repeater system may be employed, such as, for example, that shown in Patent #1,296,440 to E. A. Sperry granted March 4, 1919, for controlling repeater compasses from a distance.

The operation of my invention will now be readily apparent. When cruising on the high seas, the control handles 40 and 41 will be together. If the pilot should desire to stop the ship quickly, he transmits to the engine room the proper signal to separate handles 40 and 41. This will immediately reverse one pair of engines, leaving the other connected with the propeller shaft. The pilot may at the same time move the rheostat arm to the right in Fig. 8, thereby connecting the engine which has been reversed with the propeller shaft, rather than the engine which remains running in the same direction. This will reverse the propeller immediately. The speed of the propeller in reversing or in starting up the ship may be controlled not only by adjusting the engine speed as explained, but by the position of the rheostat arm 52, which governs the slip which takes place between the propeller and the engine, through the electromagnetic clutch. The speed of the engine is effectively governed by the governor 80 above described and handle 90, so that no matter how great changes in load occur, the engine will not stall, but will maintain uniform speed.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is,

1. A combustion engine drive for ships comprising the combination with the propeller shaft, of a plurality of engine units for driving said shaft, a clutch between at least one of said units and said shaft, direction control means for said units whereby said units may be driven in the same or opposite directions, and means whereby said clutch is released when said units are operated so as to revolve said shaft in opposite directions.

2. A system of ship's propulsion comprising a plurality of power elements, a propeller shaft, power transmission couplings between said elements and said shaft, and means for automatically rendering said couplings effective when said elements are running so as to revolve said shaft in the same direction and for rendering said couplings ineffective when said elements are running oppositely.

3. A system of ship's propulsion comprising a plurality of power elements, a propeller shaft, variable speed power transmission couplings between said elements and said shaft, means for automatically rendering said couplings effective when said elements are running in the same effective direction and for rendering said couplings ineffective when said elements are running opposite, and means for adjusting the speeds of such elements.

4. A system of ship's propulsion comprising a plurality of reversible motors, a propeller shaft, power transmitting couplings extending between each motor and the propeller shaft, means whereby only certain of the couplings may be rendered effective when the motors are running in opposite directions and whereby all of said couplings may be rendered effective simultaneously when the motors are running in the same effective direction.

5. A system of ship's propulsion comprising a plurality of reversible motors, a propeller shaft and power driving couplings for each motor, means whereby all of said couplings are rendered effective when all of said motors operate to drive the propeller shaft in the same direction, and a common control means rendered effective by the reversal of at least one of said motors for rendering the couplings effective dissimultaneously so that when one is on the other is off.

6. A system of ship's propulsion comprising a plurality of reversible motors, means for reversing said motors, a propeller shaft and power driving couplings for each motor, means whereby all of said couplings are rendered effective when all of said motors operate to drive the propeller shaft in the same direction, and a common control means rendered effective by the reversal of at least one of said motors for rendering the couplings effective dissimultaneously so that when one is on the other is off, the said common means also including speed varying mechanism for varying the speed of transmission.

7. A combustion engine drive for ships comprising the combination with the propeller shaft, of a plurality of engine units for driving said shaft, a clutch between each of said units and said shaft, direction control means for said units, whereby said units may be driven in the same or opposite directions, means whereby one of said clutches is released when said units are turned in opposite effective directions, and means for rendering either clutch operative and the other inoperative at will, to reverse the propeller shaft.

8. In a system for maneuvering a vessel, a propeller shaft, a plurality of internal combustion engines coupled to said shaft and effective to operate said shaft normally in the same direction, means for reversing at least one engine and automatically uncoupling one of said engines from the propeller shaft, and means for coupling and uncoupling either of the engines to the shaft at will.

9. In a system for maneuvering a vessel, a propeller shaft, a plurality of internal combustion engines coupled to said shaft and effective to operate said shaft normally in the same direction, and means for reversing at least one engine and automatically uncoupling those of said engines running in an opposite direction.

10. In a system of ship's propulsion comprising a propeller shaft, a plurality of motors, couplings for connecting the propeller shaft to either or both motors while they are in operation, a governor for each motor actuated from said shaft, means for varying the speed of each motor, and means whereby said governor controls said last-named means to maintain the speed of said motors constant from idling to full load.

11. A system of ship's propulsion comprising a plurality of reversible motors, a propeller shaft and power driving couplings for each motor, a common control means for applying the couplings dissimultaneously so that when one is on, the other is off, and a plurality of alternative means adapted to be located at a distance for selecting which coupling to apply, whereby the ship's propeller may be stopped or driven in either direction from various points on the ship.

12. In a system of ship's propulsion, the combination with a plurality of engines and a propeller shaft, electrically operated clutches between each engine and said shaft, and a controller for said clutches adapted to be located at a plurality of points on the ship, and means whereby said controller operates to drive the propeller shaft forward and reverse at variable speeds.

13. In a system of ship's propulsion, the combination with a plurality of engines and a propeller shaft, electrically operated clutches between each engine and said shaft, and a plurality of interlocking alternative controllers for said clutches located at a plurality of points on the ship for driving forward and reversing the propeller shaft at variable speeds.

14. A combustion engine drive comprising a plurality of engines, a shaft, a clutch between each engine and said shaft, means whereby all of said clutches are rendered effective when all of said engines drive said shaft in the same direction, and means whereby the reversal of one of said engines renders certain of said clutches ineffective.

15. A combustion engine drive comprising a plurality of engines, a shaft, a clutch between each engine and said shaft, means whereby all of said clutches are rendered effective when all of said engines drive said shaft in the same direction, and means whereby the reversal of one of said engines renders certain of said clutches ineffective, said last named means including means whereby any of said clutches may thereafter be selectively rendered effective or ineffective.

16. A system of ship's propulsion, in combination with a plurality of engines and a propeller shaft, electrically operated clutches between each engine and said shaft, a plurality of interlocking alternative controllers for said clutches located at a plurality of points on the ship for driving the propeller shaft forward and reverse at variable speeds, and means for rendering the remaining controllers inoperative when one of said controllers is operated.

17. A system of ship's propulsion comprising a plurality of power elements, a propeller shaft, variable speed power transmission couplings between said elements and said shaft, means for automatically rendering said couplings effective when said elements are applying torques to said shaft in the same effective direction and for rendering the couplings of certain of said elements ineffective when said last-named elements cease to apply torques in the said direction.

In testimony whereof I have affixed my signature.

ELMER A. SPERRY.